(12) United States Patent
Chen

(10) Patent No.: US 8,905,539 B2
(45) Date of Patent: Dec. 9, 2014

(54) EYEGLASSES

(76) Inventor: Lin-Yun Chen, Tainan (TW)

(*) Notice: Subject to any disclaimer, the term of this patent is extended or adjusted under 35 U.S.C. 154(b) by 112 days.

(21) Appl. No.: 13/541,085

(22) Filed: Jul. 3, 2012

(65) Prior Publication Data

US 2013/0321757 A1    Dec. 5, 2013

(30) Foreign Application Priority Data

May 30, 2012  (TW) .............................. 101119234 A

(51) Int. Cl.
*G02C 9/00* (2006.01)
*G02C 9/04* (2006.01)

(52) U.S. Cl.
CPC .............. *G02C 9/00* (2013.01); *G02C 2200/02* (2013.01); *G02C 9/04* (2013.01); *G02C 2200/06* (2013.01)
USPC .................................. 351/47; 351/51; 351/57

(58) Field of Classification Search
CPC .................. G02C 2200/02; G02C 5/22–5/229; G02C 5/001; G02C 1/04; G02C 11/08; G02C 2200/04; G02C 2200/06; G02C 9/04
USPC .................................................... 351/41–158
See application file for complete search history.

(56) References Cited

U.S. PATENT DOCUMENTS

| | | | | |
|---|---|---|---|---|
| 6,217,170 | B1* | 4/2001 | Hsiao | 351/153 |
| 6,478,420 | B2* | 11/2002 | Xiang | 351/47 |
| 6,923,536 | B2* | 8/2005 | Huang | 351/47 |
| 7,070,272 | B1* | 7/2006 | Lu | 351/105 |
| 7,452,069 | B2* | 11/2008 | Lipawsky | 351/47 |
| 7,794,080 | B2* | 9/2010 | Zelazowski | 351/153 |
| 7,850,301 | B2* | 12/2010 | DiChiara | 351/106 |
| 2010/0060846 | A1* | 3/2010 | Zelazowski | 351/57 |

* cited by examiner

*Primary Examiner* — Scott J Sugarman
*Assistant Examiner* — Daniele Manikeu
(74) *Attorney, Agent, or Firm* — Alan Kamrath; Kamrath IP Lawfirm, P.A.

(57) ABSTRACT

A pair of eyeglasses includes a frame, two lenses, two first magnets, two temples, and two fasteners. The frame includes two lens-holding portions and two magnet-seats. The lenses are held by the lens-holding portions, respectively. The first magnets are disposed at the magnet-seats respectively. The temples are connected with two sides of the frame respectively. The fasteners, each having a second magnet, are pivoted on the frame, and are rotatable with respect to the frame, so that the respective first magnet and the respective second magnet attract each other to fix the respective lens.

20 Claims, 7 Drawing Sheets

EYEGLASSES

BACKGROUND OF THE INVENTION

1. Field of the Invention

The invention relates to a pair of eyeglasses and, in particular, to a pair of eyeglasses, whose lenses are fastened by magnetic attraction.

2. Description of the Prior Art

In general, a pair of eyeglasses mainly includes a frame and two temples respectively pivoted on two sides of the frame. The frame includes two rims, and the inner edge of each of the rims has a slot to hold each of the lenses. Thereby, the sidewalls of the slot can block the lenses to prevent the lenses from leaving the frame. However, due to the blocking of the rims and during the process of fabricating the lenses to the frame, the user needs to press the lenses very hard to make them tightly clipped into the rims having some flexibility. Besides, since the lenses are breakable, sometimes they will be broken during fabrication.

SUMMARY OF THE INVENTION

In view of the foregoing problems, an objective of the invention is to provide a pair of eyeglasses whose lenses can be fixed easily to improve the use efficiency and extend the life time of the product.

To achieve the above objective, a pair of the eyeglasses of the invention includes a frame, two lenses, two first magnets, two temples, and two fasteners. The frame has two lens-holding portions and two magnet-seats. The lenses are respectively held by the lens-holding portions. The first magnets are respectively disposed at the magnet-seats. The temples are respectively connected with two sides of the frame. The fasteners, each having a second magnet, are pivoted on the frame, and are rotatable with respect to the frame, so that the respective first magnet and the respective second magnet attract each other to fix the respective lens.

As mentioned above, the frame includes a first magnet, and the fastener of the eyeglasses is pivoted on the frame and includes a second magnet. When the fastener rotates relative to the frame, the first magnet and the second magnet can attract each other, so that the lens and fastener both can be fixed. Besides, for taking off the lens, the fastener is rotated again to make the second magnet separate from the first magnet. Accordingly, regardless of the processes of fabricating or taking off the lens, the lens doesn't need to be pushed hard into the slot of the frame (as the conventional art) so that the lens can be prevented from being damaged. Accordingly, the lenses of the eyeglasses of the invention are very easy to be fixed, thereby improving the use efficiency and extending the life time of the product. Besides, with the convenient assembly and disassembly of the invention, the user can easily replace the lenses.

Further benefits and advantages of the present invention will become apparent after a careful reading of the detailed description with appropriate reference to the accompanying drawings.

DETAILED DESCRIPTION OF THE INVENTION

Figure 1:
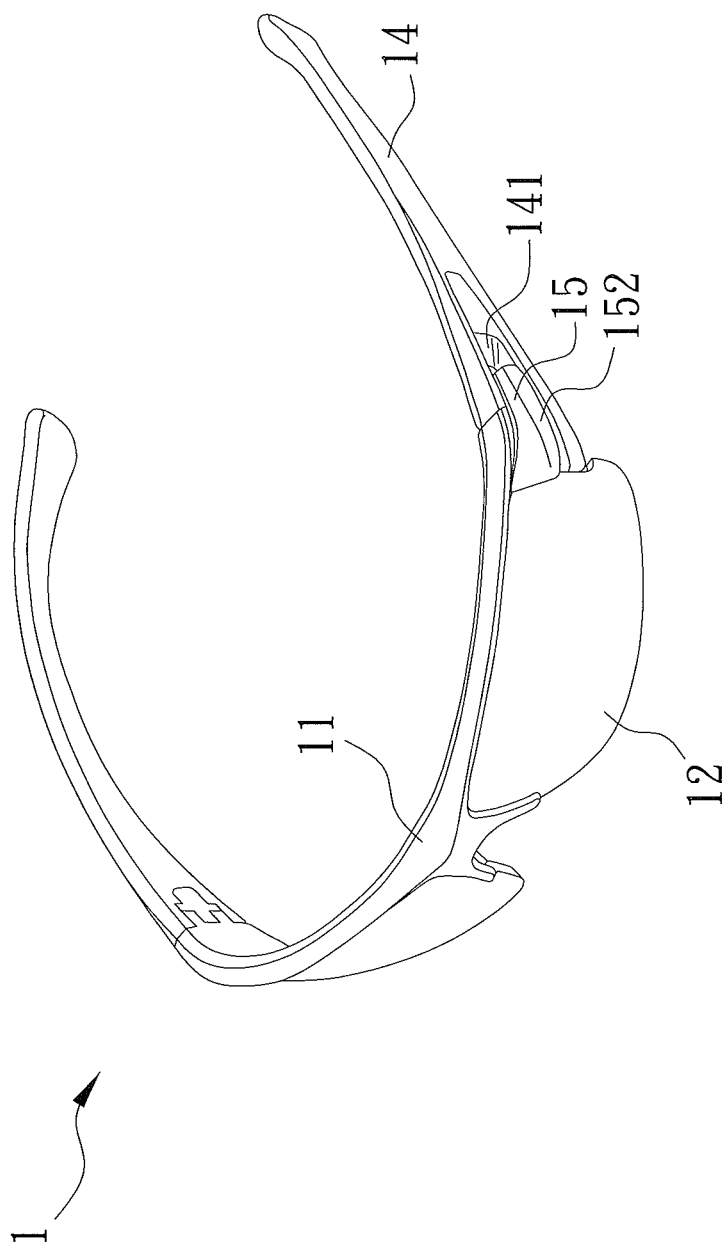
FIG. 1 is a schematic diagram of a pair of the eyeglasses of the first embodiment of the invention.
Figure 2:
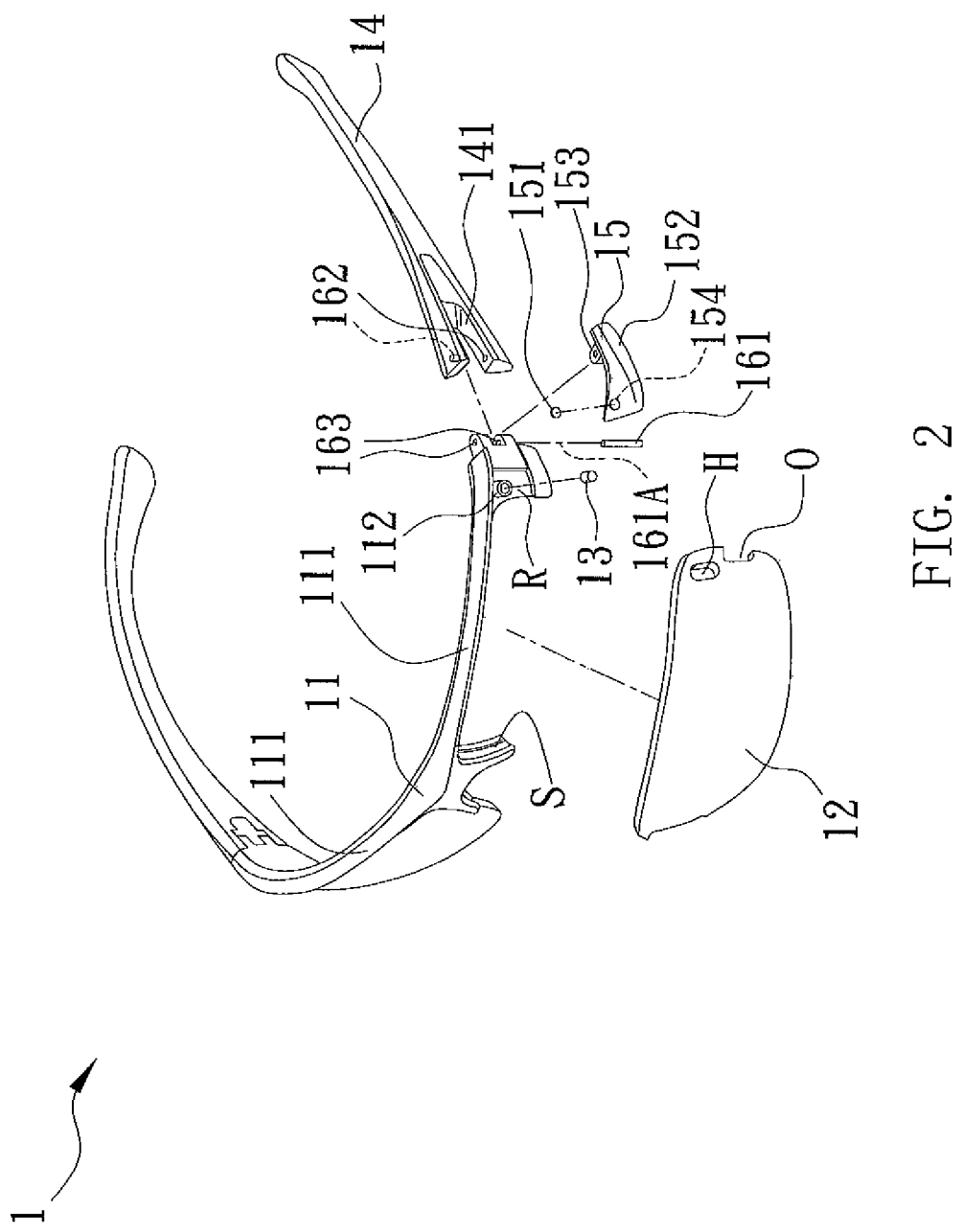
FIG. 2 is a schematic diagram showing a partial exploded structure of the eyeglasses as shown in FIG. 1.

FIG. 1 is a schematic diagram of a pair of the eyeglasses 1 of the first embodiment of the invention, and FIG. 2 is a schematic diagram showing a partial exploded structure of the eyeglasses 1. As shown in FIGS. 1 and 2, the eyeglasses 1 include a frame 11, two lenses 12, two first magnets 13, two temples 14, and two fasteners 15. In the invention, the eyeglasses 1 are not limited in type, which can be sunglasses, working eyeglasses, nearsighted eyeglasses, farsighted spectacles, or the like.

The frame 11 functions as the main part of the eyeglasses 1. The frame 11 of the embodiment is not limited in shape or curvature, which can be changed according to practical requirements. The frame 11 is also not limited in material, which can be made of, for example, metal, alloy, or plastics. The frame 11 has two lens-holding portions 111 and two magnet-seats 112, and the lenses 12 are held by the lens-holding portions 111 respectively. In the embodiment, the two lens-holding portions 111 are symmetrically disposed. Each of the lens-holding portions 111 has a slot S for holding each of the lenses 12. The width of the slot S can be substantially the same as or slightly larger than the width of the lens 12. In the embodiment, the slot S is located at a side of the lens-holding portion 111 closer to another lens-holding portion. Besides the location of the slot S as shown in FIG. 2, the slot S can be properly extended to another location in other embodiments. The magnet-seat 112 is used to fix a first magnet 13. In the embodiment, the magnet-seat 112 is located at a side of the lens-holding portion 111 closer to the corresponding temple 14. Herein, the magnet-seat 112 and the slot S are disposed at the opposite sides of the lens-holding portion 111. Besides, the lens-holding portion 111 has a recess R where the magnet-seat 112 is disposed, so that the magnet-seat 112 is lower relatively.

In the embodiment, the lens 12 is not limited in type, which can be a nearsighted lens, a farsighted lens, a multi-focus lens, or a filter lens. The lenses are respectively held by the lens-holding portions 111, and can be respectively accommodated or clipped in the slots S of the lens-holding portions 111. Besides, each of the lenses 12 can have a hole H for being passed through by the magnet-seat 112 or a second magnet 151, and her; for example, the hole H is passed through by the magnet-seat 112. Furthermore, the hole H can be a closed hole or an open hole, with the hale H being the closed hole in this embodiment. By the way, the open hole means the hole is extended to an edge of the lens 12. The lens 12 can have an opening O, which is disposed at an edge of the lens 12 and which here is an open hole, but which can be a closed hole in other embodiments. The opening O is disposed corresponding to a part of the recess R. The function of the opening O will be illustrated below.

The first magnets 13 are respectively disposed in the magnet-seats 112. Herein, the magnet-seat 112 has a hole, in which the first magnet 13 can be accommodated to be fixed tightly in the magnet-seat 112. In other embodiments, the first magnet 13 can be fixed in the magnet-seat 112 by other ways, such as by an adhesive or a clip.

Two temples 14 are respectively connected to the two sides of the frame 11 and are used to be laid on the user's ears. In the embodiment, the temple 14 is not limited in shape and material. For example, each of the temples 14 can have a hook or no hook, and it can be made of metal, alloy, or plastics. The temple 14 includes an opening 141 which can provide space for the rotation of the fastener 15. In the embodiment, the temple 14 is pivoted on the frame 11 by a pivoting structure, so that the temple 14 can rotate relative to the frame 14. In other embodiments, the temple 14 can be fixed to the frame, incapable of rotating relative to the frame. The pivoting structure includes an axle 161, the temple 14 has two holes 162 disposed at an end of the opening 141, and an end of the frame 11 has two holes 163. Accordingly, the axle 161 passes through the holes 162 and the holes 163 to constitute the pivoting structure. The pivoting structure as mentioned above is just for example, but not for limiting the scope of the invention, and nevertheless, a conventional pivoting structure also can be applied to the invention.

As shown in FIG. 2, the fastener 15 is pivoted on the frame 11 about an axis 161A, so that the first and second fasteners 15 on opposite sides of the frame 11 are pivoted about a first axis and a second axis. The fastener 15 includes a second magnet 151. The fastener 15 of the invention is not limited in shape and material. For example, the fastener 15 can be made of metal, alloy or plastics. Herein, the fastener 15 includes a blocking portion 152, a pivoting portion 153, and a containing portion 154. The pivoting portion 153 is used to make the fastener 15 pivoted on the frame 11. The containing portion 154 is used to contain the second magnet 151. The pivoting portion 153 and the containing portion 154 are disposed on the same side of the blocking portion 152, for example. The fastener 15 is pivoted on the frame 11 by a pivoting structure. In the embodiment, the fastener 15 and the temple 14 are pivoted on the frame 11 by the same pivoting structure. In other embodiments, the fastener 15 and the temple 14 can be pivoted on the frame 11 by different pivoting structures.

Figure 3:
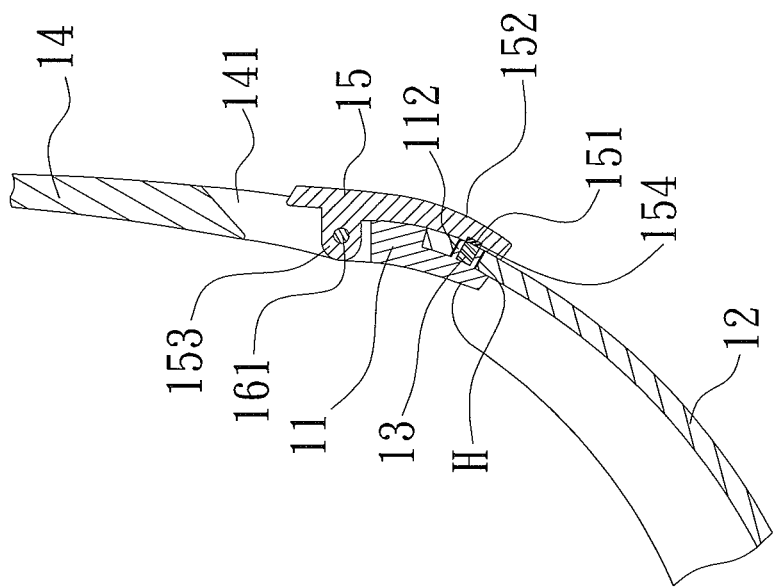
FIGS. 3 and 4 are schematic diagrams showing the rotation of the fastener of the first embodiment of the invention.
Figure 4:
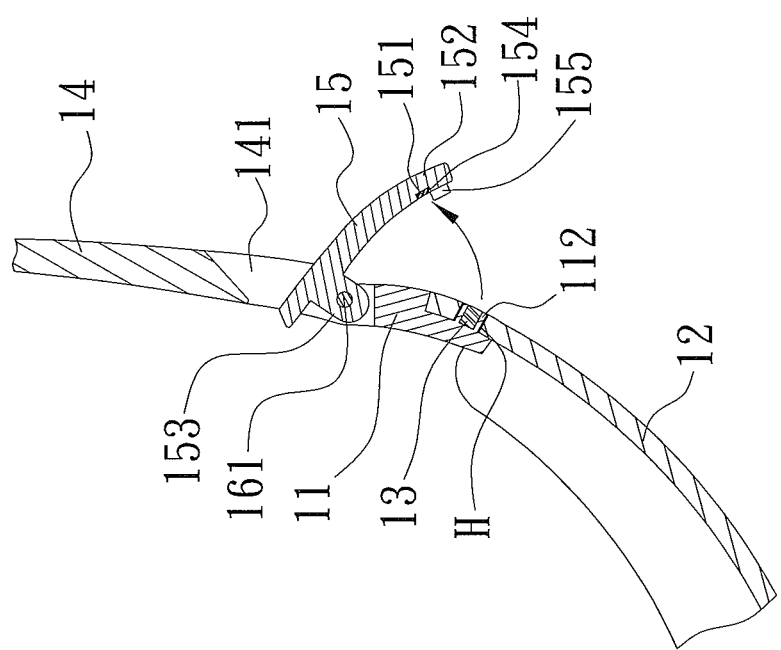

The fastener 15 can rotate relative to the frame 11, causing the first magnet 13 and the second magnet 151 to attract each other to fix the lens 12. FIGS. 3 and 4 are schematic diagrams showing the rotation of the fastener 15. As shown in FIG. 3, when the fastener 15 rotates so that the second magnet 151 comes closer to the first magnet 13, the lens 12 can be fixed by the attraction of the first and second magnets 13 and 151 which are connected through the hole H. Besides, the attraction of the first and second magnets 13 and 151 also causes the fastener 15 to be fixed. As shown in FIG. 3, the fastener 15 presses an outer surface (the surface far from the user's eyes) of the lens 12, and in detail, the outer surface is blocked by the blocking portion 152 of the fastener 15. As shown in FIG. 4, for taking off the lens 12, the fastener 15 is rotated again so that the second magnet 151 separates from the first magnet 13.

Figure 5:
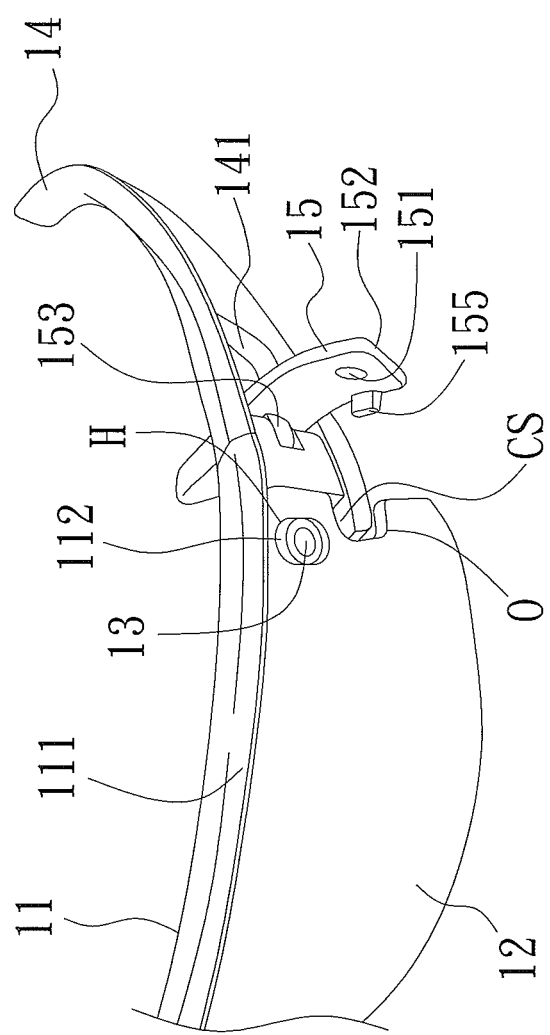
FIG. 5 is a schematic diagram of the fastener and the lens of the first embodiment of the invention.

FIG. 5 is a schematic diagram of the fastener 15 and a lens 12 of the embodiment. As shown in FIG. 5, the fastener 15 further includes a supporting portion 155. The lens 12 has an opening O, which forms a containing space CS with the frame 11, and in detail, the opening O and the recess R of the frame 11 forms the containing space CS. The supporting portion 155 can be moved into the containing space CS by the rotation of the fastener 15, pushing the lens 12 upwards to make the lens 12 fixed more tightly.

Figure 6:
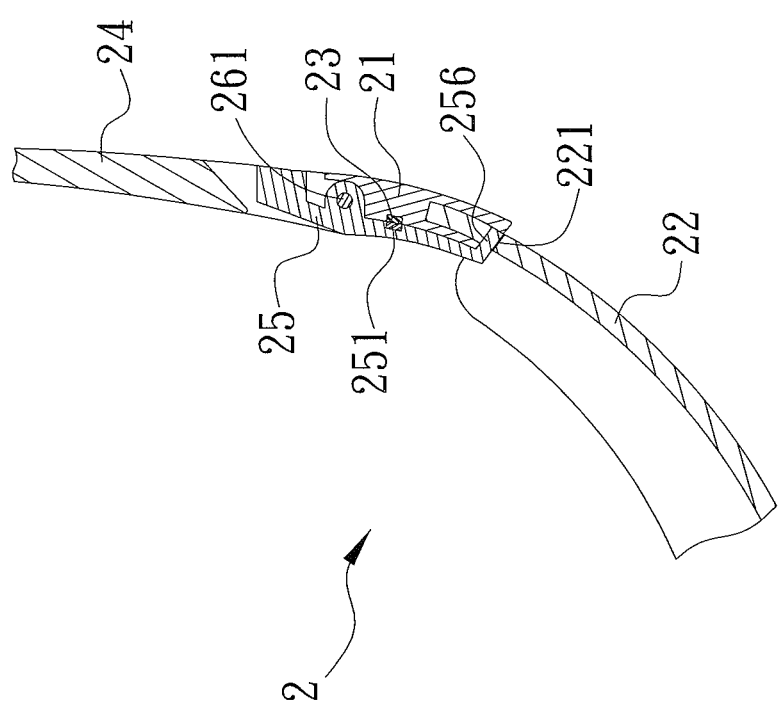
FIGS. 6 and 7 are schematic diagrams of a pair of eyeglasses of the second embodiment of the invention.
Figure 7:
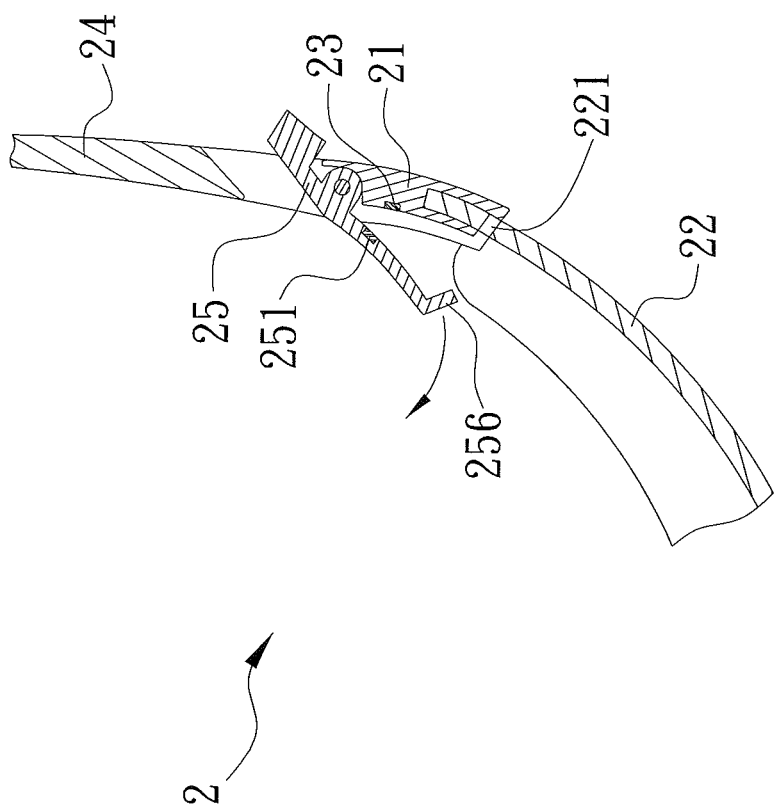

FIGS. 6 and 7 are schematic diagrams of a pair of eyeglasses 2 of the second embodiment of the invention. The eyeglasses 2 include a frame 21, two lenses 22, two first magnets 23, two temples 24, and two fasteners 25 (only one part of the above elements shown in the figures). The eyeglasses 2 can have the same technical features as the eyeglasses 1 of the first embodiment, but nevertheless, the main difference between them is that the fastener 25 fixes an inner surface (the surface closer to the user's eyes) of the lens 22. As shown in FIG. 6, the fastener 25 includes a hook 256, and can be rotated about an axle 261 relative to the frame 21 so that the lens 22 can be fixed by the hook 256 due to the attraction of the first and second magnets 23 and 251. In the embodiment, the lens 22 has a hole 221 through which the hook 256 can pass to fix the lens 22. As shown in FIG. 7, for taking off the lens 22, the fastener 25 is rotated to make the second magnet 251 separate from the first magnet 23 and make the hook 256 separate from the lens 22.

To be noted, the first magnet and the second magnet as mentioned above can be composed of two magnets, or a magnet and a magnetic device. The magnetic device is, for example, metal, alloy or other magnetic material.

In summary, the frame includes a first magnet, and the fastener of the eyeglasses is pivoted on the frame and includes a second magnet. When the fastener rotates relative to the frame, the first magnet and the second magnet can attract each other so that the lens and fastener both can be fixed. Besides, for taking off the lens, the fastener is rotated again to make the second magnet separate from the first magnet. Accordingly, regardless of the processes of fabricating or taking off the lens, the lens doesn't need to be pushed hard into the slot of the frame (as the conventional art) so that the lens can be prevented from being damaged. Accordingly, the lenses of the eyeglasses of the invention are very easy to be fixed, thereby improving the use efficiency and extending the life time of the product. Besides, with the convenient assembly and disassembly of the invention, the user can easily replace the lenses.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A pair of eyeglasses, comprising:
   a frame having two lens-holding portions and two magnet-seats;
   first and second lenses respectively held by the two lens-holding portions;
   two first magnets respectively disposed at the two magnet-seats;
   two temples respectively connected with two sides of the frame; and
   first and second fasteners pivoted on the frame about a first axis and a second axis, with the first and second fasteners having two second magnets, respectively, radially spaced from the first axis and the second axis, with the first and second fasteners rotatable with respect to the two temples and the frame between a fixing position with the respective first magnet and the respective second magnet attracting each other to fix the respective lens in the lens-holding portion and a separated position with the respective first magnet separate from the respective second magnet to space the fastener from the respective lens.

2. The eyeglasses as recited in claim 1, wherein the two lens-holding portions each have a slot for containing the respective lens.

3. The eyeglasses as recited in claim 1, wherein one of the two magnet-seats is located at a side of the corresponding lens-holding portion closer to the corresponding temple.

4. The eyeglasses as recited in claim 1, wherein one of the first and second fasteners is pivoted on the frame by a pivoting structure, and wherein one of the two temples is also connected to the frame by the pivoting structure.

5. The eyeglasses as recited in claim 1, wherein one of the two temples has an opening extending radially relative to one of the first axis and the second axis and providing a space for the rotation of one of the first and second fasteners.

6. The eyeglasses as recited in claim 1, wherein one of the first and second fasteners includes a supporting portion radially spaced from one of the first axis and the second axis, wherein one of the first and second lenses has an opening that forms a containing space receiving the frame, and wherein the supporting portion is moved into the containing space by the rotation of the one of the first and second fasteners into the fixing position and is moved out of the containing space in the separated position.

7. The eyeglasses as recited in claim 1, wherein one of the first and second lenses has a hole, and wherein the first and second magnets are connected to each other through the hole.

8. The eyeglasses as recited in claim 1, wherein one of the first and second lenses has a hole, wherein the two first magnets are respectively disposed in the two magnet-seats, and wherein the magnet-seat passes through the hole.

9. The eyeglasses as recited in claim 1, wherein one of the first and second fasteners presses an outer surface of one of the first and second lenses.

10. The eyeglasses as recited in claim 1, wherein one of the first and second fasteners presses an inner surface of one of the first and second lenses.

11. The eyeglasses as recited in claim 1, wherein one of the first and second fasteners includes a hook radially spaced from one of the first axis and the second axis and the second magnet, and wherein the one of the first and second fasteners is rotated relative to the two temples and the frame with the first and second magnets attracting each other to fix the lens by the hook.

12. The eyeglasses as recited in claim 11, wherein one of the first and second lenses has a hole, and wherein the hook passes through the hole.

13. The eyeglasses as recited in claim 12, wherein the second magnet is radially intermediate the hook and the one of the first axis and the second axis.

14. The eyeglasses as recited in claim 13, wherein one of the first and second fasteners is pivoted on the frame by a pivoting structure, and wherein one of the two temples is also connected to the frame by the pivoting structure.

15. The eyeglasses as recited in claim 14, wherein one of the two temples has an opening extending radially relative to the one of the first axis and the second axis and providing a space for the rotation of the one of the first and second fasteners.

16. The eyeglasses as recited in claim 6, wherein the second magnet is radially intermediate the supporting portion and the one of the first axis and the second axis.

17. The eyeglasses as recited in claim 16, wherein the one of the first and second lenses has a perimeter edge, with the opening intersecting the perimeter edge.

18. The eyeglasses as recited in claim 17, wherein one of the first and second fasteners is pivoted on the frame by a pivoting structure, and wherein one of the two temples is also connected to the frame by the pivoting structure.

19. The eyeglasses as recited in claim 18, wherein one of the two temples has an opening extending radially relative to the one of the first axis and the second axis and providing a space for the rotation of the one of the first and second fasteners.

20. The eyeglasses as recited in claim 4, wherein one of the two temples has an opening extending radially relative to one of the first axis and the second axis and providing a space for the rotation of the one of the first and second fasteners.

\* \* \* \* \*